United States Patent Office 3,734,991
Patented May 22, 1973

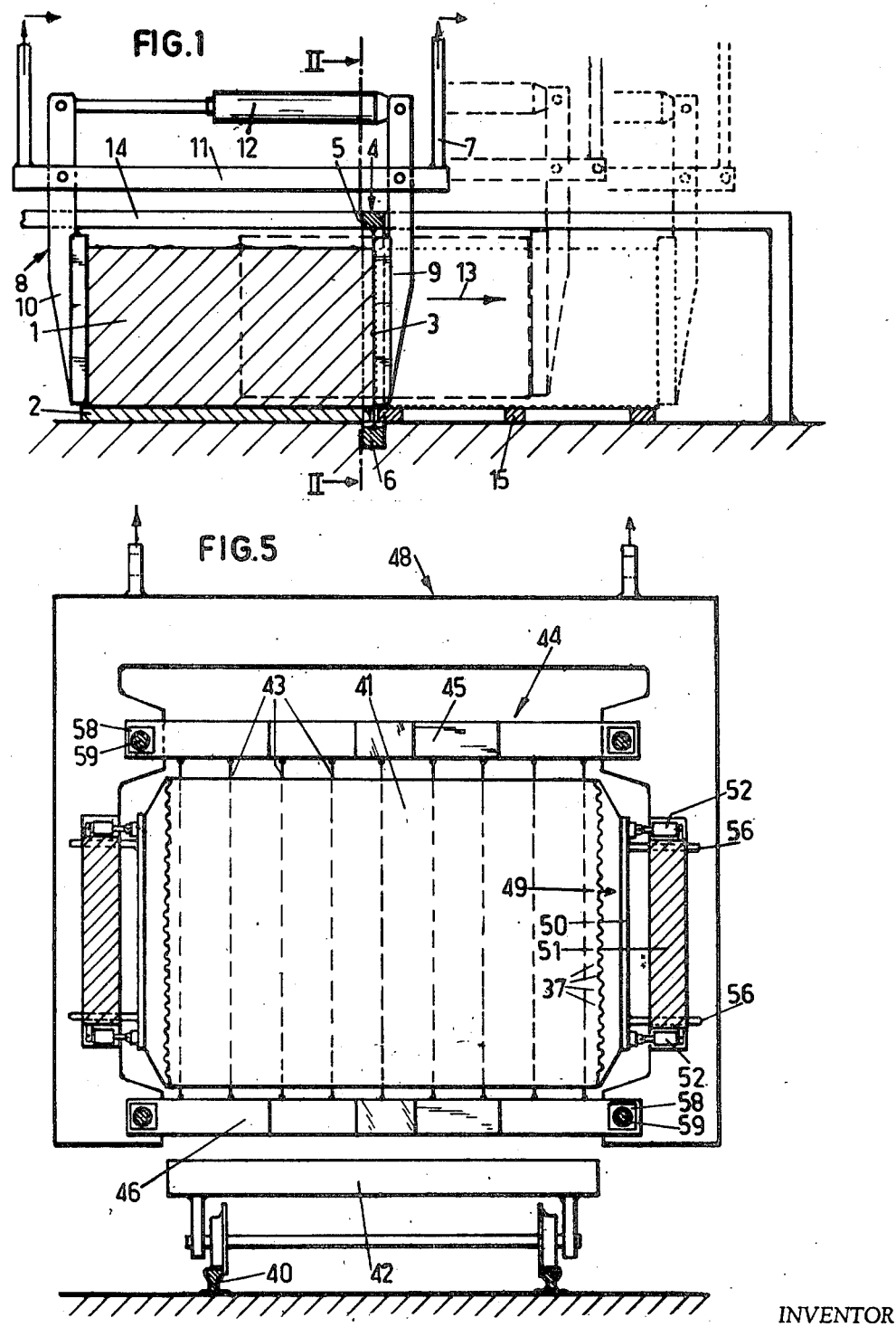

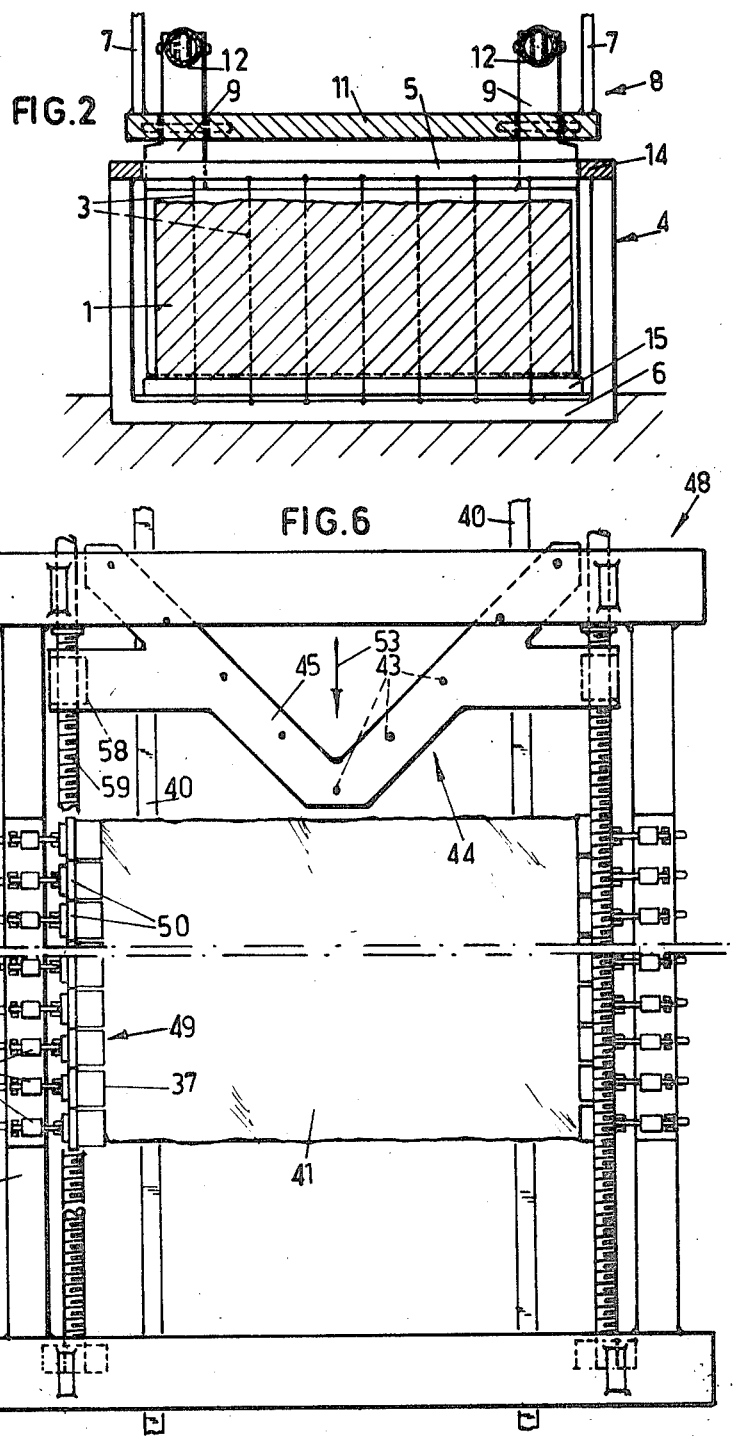

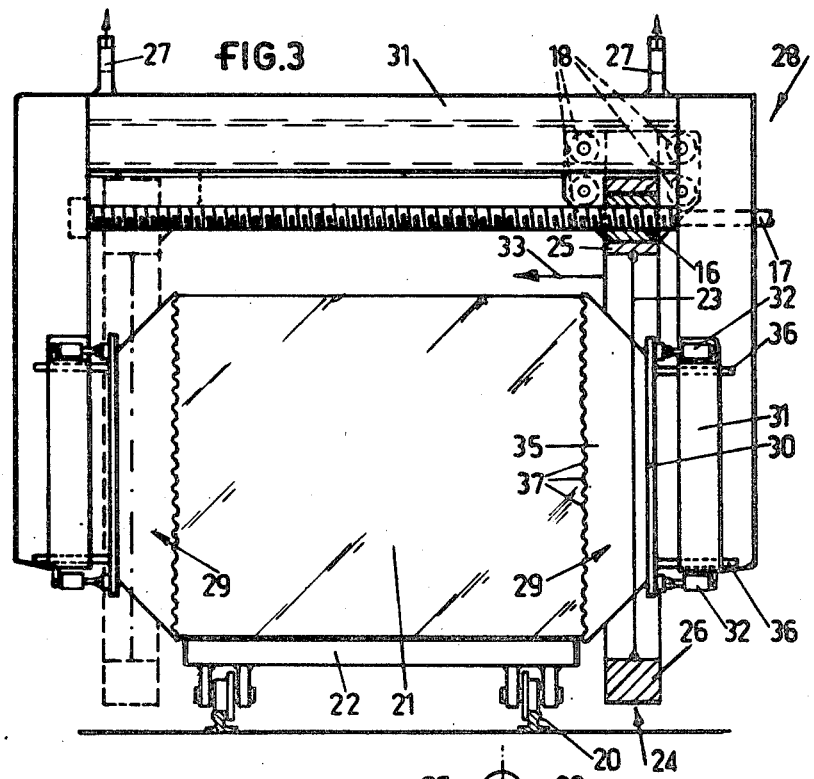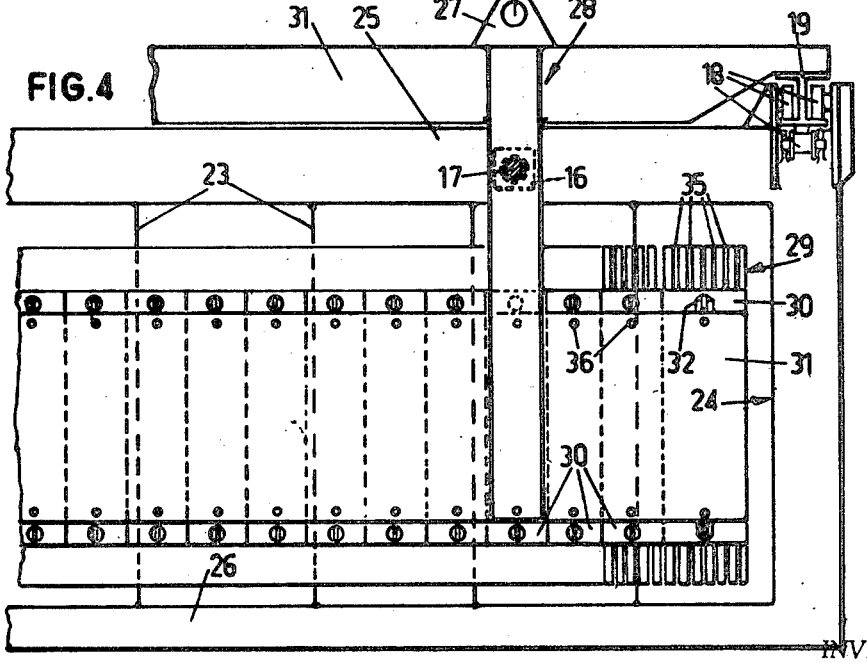

3,734,991
METHOD FOR CUTTING PLASTIC MATERIAL
Berend Vrijma, Vuren, Netherlands, assignor to Calsilox S.A., Luxemburg, Belgium
Filed June 22, 1970, Ser. No. 48,267
Claims priority, application Netherlands, June 26, 1969, 6909800
Int. Cl. B28b *11/14*
U.S. Cl. 264—157     3 Claims

ABSTRACT OF THE DISCLOSURE

The invention relates to a method of cutting a block of material in a plastic state, more particularly light weight concrete, the block being cut by a number of cutting wires each tensioned between a clamping member retained above the block and a clamping member retained therebelow.

A method is provided in which the block can be cut along any selected planes parallel with a cutting direction, and in which the required conveying means can be very simple.

To this end the block is cut while being carried by carrying means engaging opposite sides of the block.

---

The invention relates to a method of cutting a block of material in a plastic state, more particularly light weight concerete, the block being cut by a number of cutting wires each tensioned between a clamping member retained above the block and a clamping member retained therebelow.

In a known method of the kind specified, during cutting the block stands on a cutting table so shaped that during cutting the clamping member retained below the block can move in relation to the cutting table.

The block can be cut only along the planes determined by the construction of the cutting table.

This known method also requires conveying means which can place the block on the cutting table and remove the cut block therefrom.

Another method is known, in which the block can be cut along any selected cutting planes, by the block being conveyed from a first cutting table having conveying means through a frame of cuting wires on to a second cutting table also having conveying means.

The two cutting tables require conveying means which can not only displace the block from the first to the second cutting table, but which are also adapted to take the block from a feed member, for instance the bottom of a casting mould, and place the block on the first cutting table and to remove the cut block from the second cutting table and place it on a removal member.

The invention provides a method in which the block can be cut along any selected planes parallel with a cutting direction, and in which the required conveying means can be very simple.

To this end, in the method according to the invention, the block is cut while being carried by carrying means engaging opposite sides of the block.

The invention also provides an apparatus for the performance of the method set forth hereinbefore. The apparatus comprises carrying means engaging opposite sides of the block, and a number of cutting wires to cut the block in at least one cutting direction, and is characterised by a relative movement, guided parallelly with the cutting direction, between the block-carrying means and the cutting wires.

These and other features of the method according to the invention will be gathered from the following description of a number of embodiments thereof.

In the accompanying drawings, which show variants of the method according to the invention:

FIGS. 1 and 2 are a cross-section and a longitudinal section respectively through an apparatus according to the invention, FIGS. 3 and 4 are a cross-section and a partial side elevation respectively of a variant apparatus according to the invention, and FIGS. 5 and 6 are a cross-section and a plan view respectively of a second variant of the apparatus according to the invention.

In the method illustrated in FIGS. 1 and 2, a block 1 of light-weight concrete in a plastic state is pushed against cutting wires 3 on the bottom 2 of a casting mould whose walls (not shown) are removed. A top beam 5 and a bottom beam 6 of a stationary cutting frame 4 form the tensioning members for the cutting wires 3.

The block 1 is then seized between clamping jaws 9, 10 of a gripper 8 whose frame 11 is suspended from lifting means 7. The clamping jaws 9, 10 are hingeably suspended from the frame 11 and actuated by jacks 12. When the block 1 is seized the clamping jaw 9 extends around the top beam 5. The gripper 8 with the block 1 is then raised a short distance and moved, as indicated by dotted lines, in the direction indicated by arrow 13 until the clamping jaw 10 abuts the cutting wires 3. During the cutting the gripper with the block is guided along guide rods 14. After cutting the block 1, as shown in dotted lines, is deposited on a grid 15 and then conveyed from the cutting frame 4 to a hardening vessel (not shown).

In the method illustrated in FIGS. 3 and 4, a block 21 is fed on a carriage-like bottom 22 of a casting mould, whose walls are removed, over rails 20 between clamping jaws 29 of a gripper 28. The clamping jaws 29 consist of a large number of vertical jaw members 30 each of which are guided by means of horizontal pins 36 in a frame 31 of the gripper 28 and are each brought into a clamped condition by means of jacks 32. The clamping surfaces of the jaw members 30 are formed with projections 37 penetrating into the plastic material of the block 21 and with vertical grooves 35 receiving vertical cutting wires 23. The cutting wires 23 are tensioned between a top beam 25 and a bottom beam 26 of a cutting frame which is suspended by means of rollers 18 on rails 19 from the frame 31 and engages via nuts 16 driven screw-threaded spindles 17.

After the block 21 has been tightly clamped between the clamping jaws 29, in the condition of the cutting frame 24 shown in solid lines, the gripper 28 together with the block 21 is raised by raising means 27 engaging the frame 31, so that the cutting frame 24 is disposed completely above the level of the bottom 22. Then, by driving the screwthreaded spindles 17 together, the cutting frame 24 is moved in the cutting direction 33 to the position shown in dotted lines, so that the block 21 is cut. Lastly, the gripper 28 is brought downwards, and the block 21 is placed on the bottom 22 or some other carrier. Each portion of the cut block 21 is reliably carried, since the clamping jaws 29 are subdivided into a number of jaw members 30 which are pressed against the block independently by means of jacks 32.

In the method illustrated in FIGS. 5 and 6, a block 41 is fed on a carriage-like bottom 42 of a casting mould over rails 40 between clamping jaws 49 of a gripper 48. The clamping jaws 49 consist of a large number of vertical jaw members 50 which have projections 37, are each guided by horizontal pins 56 in a frame 51 of the gripper 48, and are each brought into a clamped condition by rams 52.

Cutting wires 43 are tensioned between V-shaped beams 45, 46 of a cutting frame 44. The cutting wires 43 are therefore receded in relation to one another, viewed in the direction indicated by the arrow 53, so that they come into contact with the block 41 successively. The cutting frame 44 is guided by rollers 38, parallel with the clamping jaws 49, over rails 39 of a frame 51 and, when the gripper 48 is raised, the cutting frame 44 can be driven by means of nuts 58 and screwthreaded spindles 59 in cutting direction 53, so that the block 41 is cut. During the cutting of the block 41, behind the cutting wires 43 open grooves are produced which however, are tightly closed again by the clamping pressure of the clamping jaws 49. The width of the block 41 is reduced by one cutting wire width for each cutting wire.

What I claim is:

1. A method of cutting a block of material in the plastic state, such as lightweight concrete, the block being cut by means of a cutting frame comprising a plurality of spaced cutting wires disposed substantially vertically under tension between an upper tensioning member and a lower tensioning member, which comprises, supporting said block solely by gripping opposite sides thereof by clamping means with the cutting frame disposed between said clamping means, lifting said block solely by said clamping means whereby to provide a free path below the bottom of said block relative to said cutting frame such that the upper tensioning member of said frame is above the upper surface of said block and the lower tensioning member is below the bottom surface of said block, and then causing the cutting frame and the block to move relative to one another whereby the cutting wires pass freely through the plastic block starting from one of the clamps and finishing in the direction of the other clamp and effect the cutting thereof while being solely supported by said clamping means.

2. The method of claim 1, wherein the cutting frame is stationary and the supported block is moved through the spaced wires thereof during cutting.

3. The method of claim 1, wherein the supported block is stationary and the cutting frame is caused to move relative to said block to effect the cutting thereof.

References Cited

UNITED STATES PATENTS

| | | | |
|---|---|---|---|
| 3,059,306 | 10/1962 | Hamilton | 25—112 X |
| 3,204,315 | 9/1965 | Akerfors | 25—105 |
| 2,694,846 | 11/1954 | Olsson et al. | 25—105 |
| 3,344,492 | 10/1967 | Eggeling et al. | 25—105 X |

ROBERT F. WHITE, Primary Examiner

A. M. SOKAL, Assistant Examiner

U.S. Xl. X.R.

83—145; 425—289